United States Patent [19]

Stolowitz et al.

[11] Patent Number: 4,837,348

[45] Date of Patent: Jun. 6, 1989

[54] BONDED PHASE CHROMATOGRAPHIC SUPPORTS

[75] Inventors: Mark L. Stolowitz, Long Beach; Amy G. Taketomo, Gardena, both of Calif.

[73] Assignee: Varian Associates, Inc., Palo Alto, Calif.

[21] Appl. No.: 859,148

[22] Filed: Apr. 30, 1986

[51] Int. Cl.$^4$ .................................................. C07F 7/10
[52] U.S. Cl. ...................................... 556/9; 548/110; 556/402; 556/421
[58] Field of Search ................. 548/110; 556/421, 402, 556/70, 9

[56] References Cited

U.S. PATENT DOCUMENTS

| | | | |
|---|---|---|---|
| 2,907,782 | 10/1959 | Pkie | 556/421 |
| 3,652,761 | 3/1972 | Wectall | 424/12 |
| 4,316,041 | 2/1982 | Totten et al. | 556/421 X |
| 4,432,877 | 2/1984 | Tzdikov | 210/656 |
| 4,435,567 | 3/1984 | Lugosi et al. | 564/61 X |

FOREIGN PATENT DOCUMENTS 2042976  3/1971  Fed. Rep. of Germany .

OTHER PUBLICATIONS

Glad et al., Chemical Abstracts, Vol. 101 (1984) 232519 L.

Engelhardtet al., J. Chromatograhy, Vo. 185 (1979) pp. 305-319.

*Primary Examiner*—Richard L. Raymond
*Attorney, Agent, or Firm*—Stanley Z. Cole; David Schnapf; Gerald M. Fisher

[57] ABSTRACT

The invention relates to the functionalization of particulate bonded phase chromatographic supports prepared by silanization of silica gel or controlled pore glass and containing pendant primary alkyl amine groups. Functionalization results from the activation of the amines by reaction with N,N'-carbonyldiimidazole (CDI), or a related azolide, in anhydrous organic solvent, followed by derivatization of the support. Derivatization results from reaction of the activated support with a functionalizing reagent consisting of a primary or secondary, alkyl or aryl amine in organic solvent, or from an aqueous solution of the amine or its salt. A urea linkage results through which the functionalizing reagent is covalently attached to the support. Derivatization can result from the addition of an excess of a single reagent, or as a consequence of the sequential addition of two or more functionalizing reagents. Chromatographic supports preparation in this manner yield materials suitable for affinity, covalent, ion exchange and hydrophobic interaction chromatography of biomolecules as well as for the preparation of immobilized reagents.

6 Claims, 3 Drawing Sheets

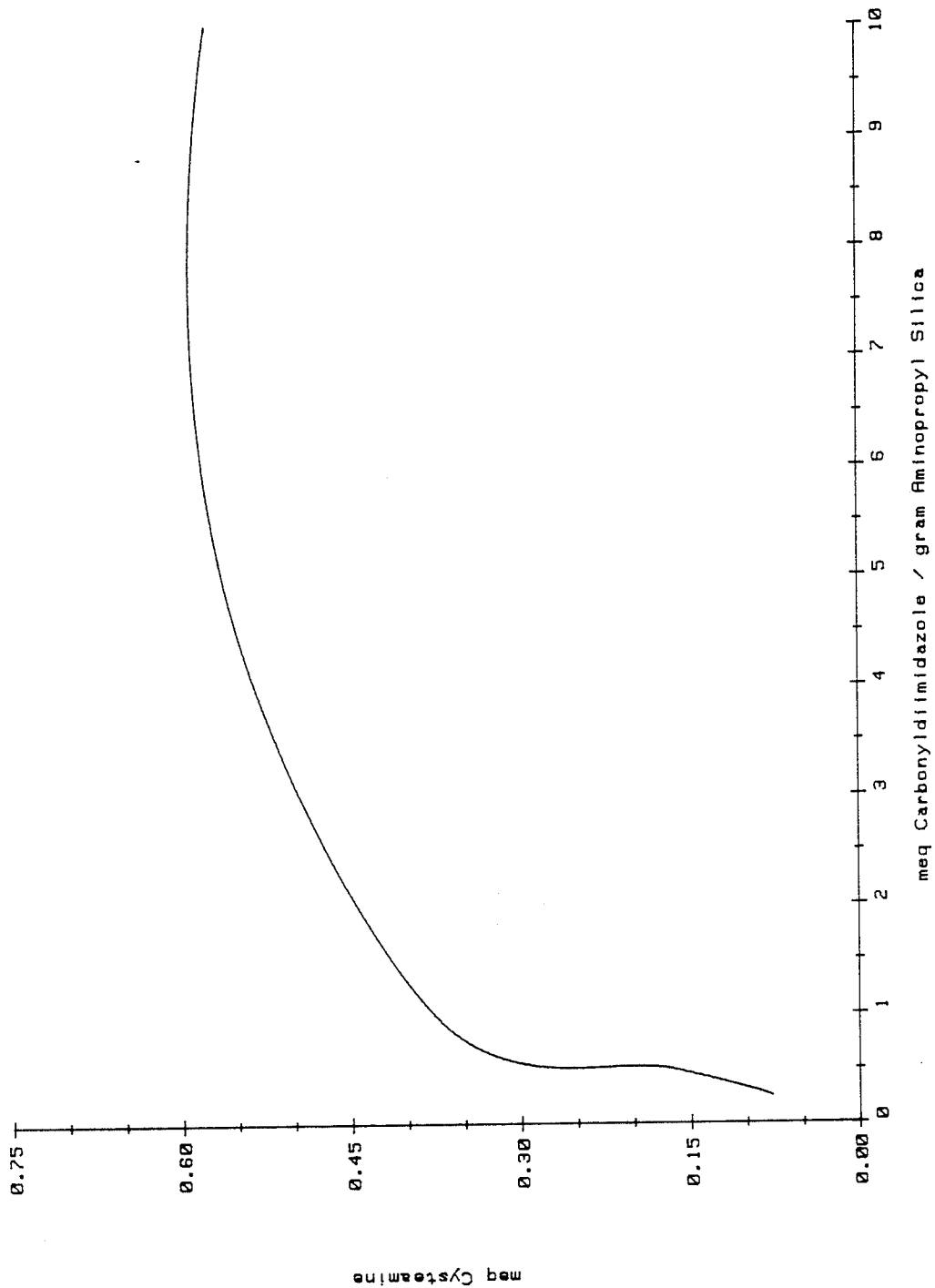

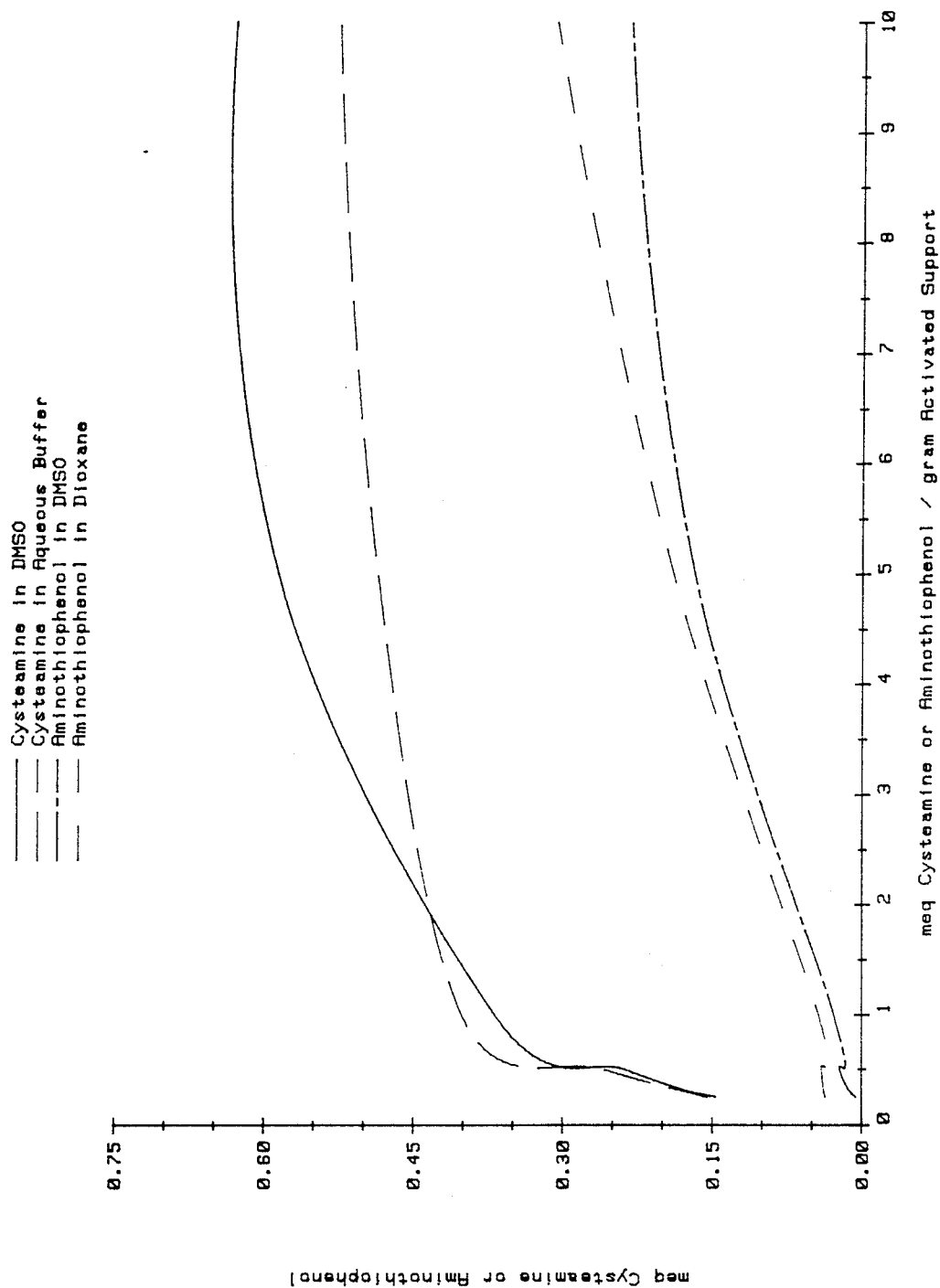

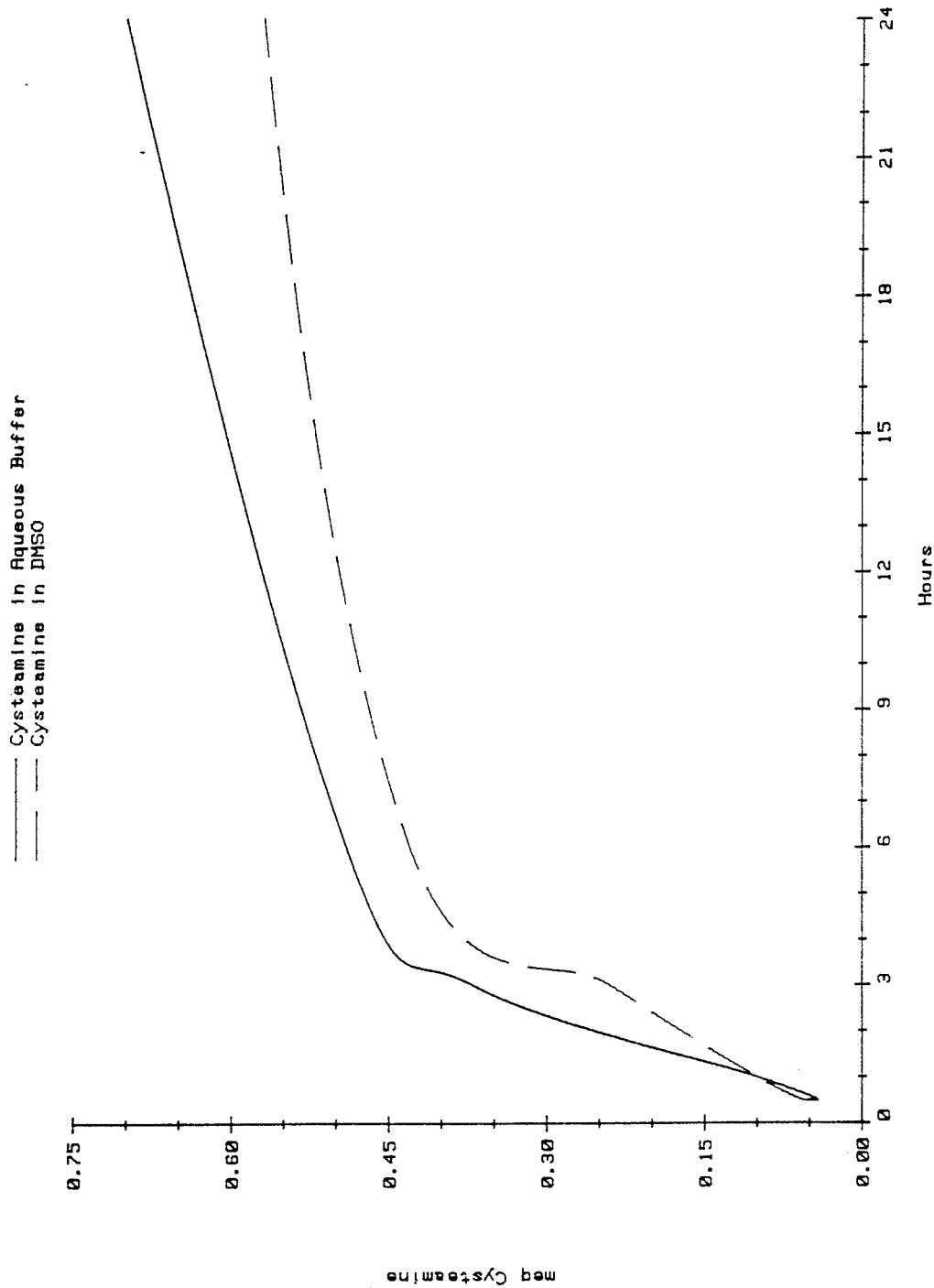

BONDED PHASE CHROMATOGRAPHIC SUPPORTS

FIELD OF THE INVENTION

The present invention relates to the field of separation chromatography, and more particularly to bonded phase chromatographic supports of silica or porous glass beads having derivatized supports, and a method of making the same.

BACKGROUND OF THE INVENTION

Early work in the field of chromatography utilized supports prepared from natural substances such as agarose, cross-linked dextran and the like. These materials, while adequate, lack rigidity, and therefore are not particularly useful for high pressure chromatography because the pressure thereon can deform the substances, or otherwise cause them to collapse, thereby slowing the acceptable flow rate considerably.

More recently, new developments have been made in the field allowing the functionalization of rigid support materials. Among the chromatographic supports used in the separation of biological macromolecules are bonded phase silica and porous glass beads comprising on their surface pendant hydrophilic moeities resulting from reaction of the activated silica or glass surface with a reactive organosilane, immobilizing the organosilane through a siloxane linkage to a silanol group on the surface. The hydrophilic moiety is attached to the reactive organosilane through an alkyl or aryl spacer group. Functional groups including glycidoxypropyl, aminopropyl, polyethyleneoxide and polyethyleneimine and derivatives thereof, have been used.

Certain problems were encountered in using these prior art systems, particularly for chromatographic separation of biological macromolecules. Nonspecific hydrophobic interaction between the straight chain alkyl backbone and the hydrophobic portion of the biological molecules has been observed, particularly when chromatography occurs under aqueous conditions. In addition, ionic interaction and hydrogen bonding has been observed between the silanol matrix and the polar functional groups of the derivatizing silane. This causes the functional groups to double back and bind to the matrix thereby making them unavailable for the intended chromatographic interaction.

In an effort to prepare materials lacking the aforementioned properties, bonded phase chromatographic supports prepared by reaction of 3-glycidoxypropyltrimethoxysilane with activated particulate silica or controlled pore glass were further derivatized by the addition of an amine or other nucleophile to the epoxide functionality of the bonded phase, as shown in Equation A below:

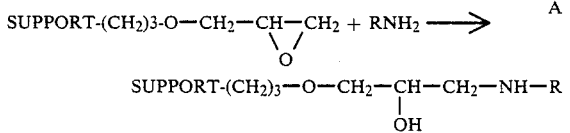

Other approaches have included the preparation of phases resulting from the adsorption of polyethyleneimine and polyethyeneoxide to particulate silica followed by derivatization of the polymeric chain.

Derivatives prepared from glycidoxypropyl bonded phases exhibit considerable hydrophobic secondary interactions. Polyether bonded phases exhibit similar problems. These materials require mobile phase additives to mask residual silanol activity and hydrophobic interaction.

Most recently, in an effort to prepare chromatographic support suitable for the separation of biological macromolecules, glycidoxypropyl and methacrylate bonded phases have been copolymerized with acrylamide or functionalized acrylamide.

SUMMARY OF THE INVENTION

The invention relates to the functionalization of particulate bonded phase chromatographic supports prepared by silanization of silica gel or controlled pore glass and containing pendant primary alkyl amine groups. Functionalization results from the activation of the amines by reaction with N,N'-carbonyldiimidazole (CDI), or a related azolide, in anhydrous organic solvent, followed by derivatization of the support. Derivatization results from reaction of the activated support with a functionalizing reagent consisting of a primary or secondary, alkyl or aryl amine in organic solvent, or from an aqueous solution of the amine or its salt. A urea linkage results through which the functionalizing reagent is covalently attached to the support. Derivatization can result from the addition of an excess of a single reagent, or as a consequence of the sequential addition of two or more functionalizing reagents. Chromatographic supports prepared in this manner yield materials suitable for affinity, covalent, ion exchange and hydrophobic interaction chromatography of biomolecules as well as for the preparation of immobilized reagents.

The invention relates to the development of bonded phase chromatographic supports wherein the residual silanol activity associated with the particulate silica or controlled pore glass substrate has been effectively masked by application of a hydrophilic barrier. This eliminates the irreversible adsorption of biological macromolecules and low molecular weight amines observed with bonded phase supports which are not further derivatized.

The objectives of the present invention include:

The preparation of a physical barrier preventing interaction between surface silanols and sample components;

The derivatization of the physical barrier preventing interaction between the hydrophobic silane backbone and sample components; and The functionalization of the physical barrier to impart properties resulting in selective retention of sample components.

In addition, a number of important specific objectives are also achieved using the present invention, including:

The use of N,N'-carbonyldiimidazole for the activation of a chromatographic support with other than pendant hydroxyl groups;

The preparation of a urea derivative of a bonded phase chromatographic support and the unique hydrophilic nature of the urea linkage;

The near quantitative derivatization of bonded supports obtained by this synthetic route;

A multi-step approach wherein the chromatographic support can be prepared to exhibit two or more unique selectivities in a predetermined manner;

The almost infinite variety of ligands which can be employed as functionalizing reagents; and The effective hydrophilic barrier which results in masking residual silanol activity and the hydrophobic nature of the silane backbone.

BRIEF DESCRIPTION OF THE DRAWINGS

The invention may be more fully understood by having reference to the following drawings, wherein:

FIG. 1 shows the loading of cysteamine obtained, as determined by elemental analysis for sulfur, when varying amounts of N,N'-carbonyldiimidazole were added in THF to aminopropyl silica gel and allowed to react for 3 hours at room temperature, followed by the addition of 2 milli-equivalents of cysteamine in DMSO per gram of activated aminopropyl silica gel. The reaction with cysteamine was allowed to proceed for 24 hours at room temperature.

FIG. 2 shows the loading of cysteamine and aminothiophenol obtained after 24 hours reaction at room temperature, as determined by elemental analysis for sulfur, when varying amounts of cysteamine or aminothiophenol were added in various solvents to an activated aminopropyl silica gel. The activated aminopropyl silica gel was prepared by reaction of 2 milliequivalents of N,N'-carbonyldiimidazole in THF per gram of aminopropyl silica gel. The activation was allowed to proceed for 3 hours at room temperature.

FIG. 3 shows the loading of cysteamine obtained at various times, as determined by elemental analysis for sulfur, when 2 milliequivalents of cysteamine per gram of activated aminopropyl silica gel were allowed to react for up to 24 hours at room temperature. The activated aminopropyl silica gel was prepared by reaction of 2 milliequivalents of N,N'-carbonyldiimidazole in THF per gram of amino propyl silica gel. The activation was allowed to proceed for 3 hours at room temperature.

DETAILED INVENTION

The invention relates to the functionalization of bonded phase chromatographic supports prepared by reaction of 3-aminopropyltriethoxysilane, 3-aminopropyltrimethoxysilane, p-(aminomethylaminoethyl)-phenethyltrimethoxysilane, aminoethylaminopropyltriethoxysilane, 4-aminobutyldimethylmethoxysilane or 4-aminobutyltriethoxysilane with activated particulate silica or controlled pore glass resulting in a bonded phase chromatographic support bearing pendant primary amine groups, Formula I.

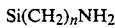
(I)

The compound of Formula I is then activated by reaction with N,N'-carbonyldiimidazole (CDI), Formula II, or a related azolide, such as carbonylditriazole, carbonyldibenzimidazole and carbonyldibenztriazole in anhydrous organic solvent including chloroform, methylene chloride, dimethylformamide and dimethylsulfoxide at room temperature to yield a compound of Formula III.

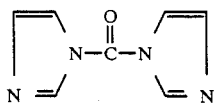
II

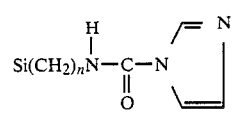
III

The compound of Formula III is derivatized by reaction with a functionalizing reagent consisting of a primary or secondary, alkyl or aryl amine in organic solvent including chloroform, dimethylformamide and dimethylsulfoxide, or from a buffered aqueous solution of the amine or its salt, at room temperature or at elevated temperature to yield a compound of Formula IV

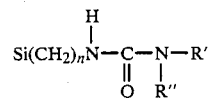
IV where R' and R"=H, alkyl, aryl, or an alkyl aryl.

The urea linkage through which the functionalizing reagent is now covalently attached to the bonded phase support is uncharged under normal chromatographic conditions and provides a hydrophilic barrier masking the properties of the silane backbone and the residual silanol activity beneath it.

If the functionalizing reagent contains an ionic group, for example taurine ($NH_2$—$CH_2$—$CH_2$—$SO_3H$), glycine ($NH_2$—$CH_2$ COOH), N,N,-diethylaminoethylenediamine ($NH_2$—$CH_2$—$CH_2$—$N(CH_2CH_3)_2$) or aminoguanidine ($NH_2$—$NH$—$C(NH_2)NH$), an ion-exchange chromatographic support will result.

If the functionalizing reagent is tris(hydroxymethyl)aminomethane, a hydrophilic chromatographic support suitable for size exclusion chromatography of biological macromolecules will result, Formula V.

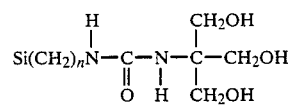
V

Derivatization of the activated support, Formula III, can result from the addition of an excess of a single functionalizing reagent, or as a consequence of the sequential addition of two or more functionalizing reagents.

If the functionalizing reagent is a reactive ligand of general formula $RNH_2$, such as aminophenylboronic acid, aminophenylmercuric acetate or aminophenylarsenoxide, and is added in limited quantity to the activated support of Formula III followed by an excess of ammonia saturated organic solvent, a chromatographic support suitable for covalent chromatography of Formula VI results. Ideally 20–30% of the activated functional groups are derivatized with the reactive ligand. If a greater percentage of derivatization is employed, steric hinderance comes into play reducing the effective capacity of the chromatographic support.

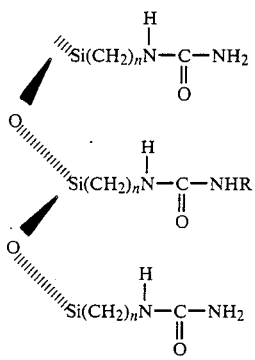

If the functionalizing reagent is an alkyl amine of general formula RNH$_2$, such as n-butylamine, n-octylamine or phenethylamine, and is added in limited quantity of the activated support of Formula III followed by an excess of tris(hydroxymethyl)aminomethane in aqueous solution, a support suitable for hydrophobic interaction chromatography of biological macromolecules of Formula VII results.

If the functionalizing reagent is a diamine, aminoalkylcarboxylic acid or short peptide of general formula RNH$_2$, such as 1,6-diaminohexane, 4-aminobutyric acid, 6-aminohexanoic acid or diglycine, and is added in limited quanity to the activated support of Formula III followed by an excess of tris(hydroxymethyl)aminomethane in aqueous solution, a support suitable for affinity chromatography of biological macromolecules of Formula VII results in which R contains an amine or carboxylic acid group through which a ligand or protein can be immobilized.

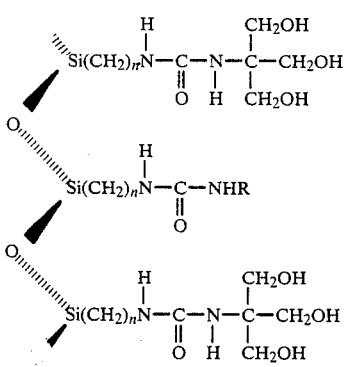

Imidodiacetic acid can be used as a functionalizing agent thereby creating activated support having the form as follows, for use as a metal chelator.

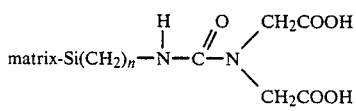

A variety of azolides other than N,N'-carbonyldiimidazole may be employed in preparation of the activated support, Formula III. Such alternatives include N,N'-carbonyldipyrazole, N,N'-carbonyldi-1,2,3-triazole, N,N'-carbonyldi-1,2,4-triazole, N,N'-carbonyldiindole, N,N,-carbonylidibenzimidazole and N,N'-carbonyldibenztriazole and others.

Alternatively, N,N'-thiocarbonyldiimidazole or thione analogs of the compounds listed above may also be employed to prepare thio-urea analogs of the varius types described by this invention. Materials of this type are believed to exhibit physical properties very similar to the urea derivatives and would also represent advantages over prior art.

In place of the alkyl chain support described above having the form (CH$_2$)$_n$ the present invention can also be applied to polymeric chromatographic support, wherein an aryl replaces the alkyl chain, as shown below.

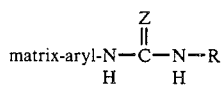

Specifically, a compound having the following form may be employed.

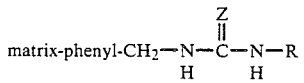

EXAMPLE I

N-Carboxymethyl-N'-propylsilylurea Silica Preparative Ion Exchange Chromatography Aminopropyl silica gel (1.5% N), 40 uM irregular with 60 Angstron average porosity, is dried at 80° C. for three hours then allowed to cool to room temperature in a desiccator. For each gram of aminopropyl silica gel, 0.8 grams of N,N'-carbonyldiimidazole and 0.13 milliliters of triethylamine are dissolved in 10 milliliters of methylene chloride. The aminopropyl silica gel is added to the reaction mixture and stirred for three hours at room temperature. The activated silica gel is filtered from solution and washed with methylene chloride, dioxane, 1:1 dioxane:water and twice with water. The activated silica gel is then immediately added to a solution of 4% (w/v) glycine in 0.1N sodium carbonate buffer. For each gram of activated silica gel, 10 milliliters of solution is employed. The reaction mixture is stirred for 24 hours at room temperature. The product is filtered from solution and washed with water, 0.1N hydrochloric acid, 1N sodium chloride and twice with water. The product is then allowed to dry to room temperature.

EXAMPLE II

N-Tris(hydroxymethyl)methyl-N'-propylsilylurea Silica Size Exclusion Chromatography of Biological Macromolecules Aminopropyl silica gel (0.5% N), 5 uM spherical with 300 Angstron average porosity, is dried at 80° C. for three hours then allowed to cool to room temperature in a desiccator. For each gram of aminopropyl silica gel, 0.3 grams of N,N'-carbonyldiimidazole and 0.05 milliliters of triethylamine are dissolved in 8 milliliters of tetrahydrofuran (THF). The aminopropyl silica gel is added to the reaction mixture and stirred for three hours at room temperature. The activated silica gel is filtered from solution and washed with THF and twice with water. The activated silica gel is then immediately added to a solution of 0.5N tris(hydroxymethyl-)aminomethane, pH 9.3. For each gram of activated silica gel, 8 milliliters of solution is employed. The reaction mixture is stirred for 24 hours at room temperature. The product is filtered from solution and washed with water, 0.1N hydrochloric acid, 1N sodium chloride and twice with water. The product is then allowed to dry to room temperature.

EXAMPLE III

N-Phenylmercuryacetate-N'-propylsilyurea Silica Preparative Covalent Chromatography Aminopropyl silica gel (1.5% N), 40 uM irregular with 60 Angstron average porosity, was dried at 80 C. for three hours then allowed to cool to room temperature in a desiccator. For each gram of aminopropyl silica gel, 0.8 grams of N,N'-carbonyldiimidazole and 0.13 milliliters of triethylamine are dissolved in 10 milliliters of methylene chloride. The aminopropyl silica gel is added to the reaction mixture and stirred for three hours at room temperature. The activated silica gel is filtered from solution and washed with methylene chloride and twice with dimethylsulfoxide (DMSO). The activated silica gel is then immediately added to a solution of 1% p-aminophenylmercuric acetate in 90% DMSO. For each gram of activated silica gel, 7 milliliters of solution is employed. The reaction mixture is stirred for 24 hours at 40 C. filtered from solution and then returned to a solution of ammonia saturated DMSO and the reaction mixture stirred for 3 hours at room temperature. Finally, the product is filtered from solution and washed with 50% DMSO, water, 0.1N hydrochloric acid, 1N sodium chloride and twice with water. The product is then allowed to dry to room temperature.

EXAMPLE IV

N-Butyl-N'-propylsilylurea Silica Hydrophobic Interaction Chromatography of Biological Macromolecules Aminopropyl silica gel (0.5% N), 5 uM spherical with 300 Angstron average porosity, was dried at 80 C. for three hours then allowed to cool to room temperature in a desiccator. For each gram of aminopropyl silica gel, 0.3 grams of N,N'-carbonyldiimidazole and 0.05 milliters of triethylamine are dissolved in 8 milliliters of tetrahydrofuran (THF). The aminopropyl silica gel is added to the reaction mixture and stirred for 3 hours at room temperature. The activated silica gel is filtered from solution and washed with THF and twice with water. The activated silica gel is then immediately added to a solution 6% n-butylamine in 0.1N sodium carbonate. For each gram of activated silica gel, 9 milliliters of solution is employed. The reaction mixture is stirred for 24 hours at room temperature. The modified silica gel is then filtered from solution, washed twice with water, and returned to a solution of 0.5N tris(hydroxymethyl)aminomethane, pH 9.3, and the reaction mixture stirred for 3 hours at room temperature. Finally, the product is filtered from solution and washed with water, 0.1N hydrochloric acid, 1N sodium chloride and twice with water. The product is then allowed to dry to room temperature.

We claim:

1. A compound having the general Formula II:

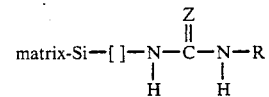

wherein R is selected from hydrogen, $-CH_2CH_2SO_3H$, carboxymethyl, diethylaminoethyl, tris(hydroxymethyl) methyl, and guanidino;

Z is oxygen or sulfur;

[] is a support selected from a straight chain alkyl having 2 to 8 carbons, aryl or alkyl aryl; and matrix is patriculate bonded silica or controlled pore glass beads.

2. The compound having the general Formula III:

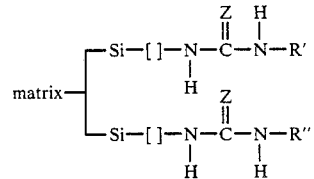

wherein R' is selected from hydrogen and tris(hydroxymethyl) methyl;

R" is selected from the group consisting of hydrogen, $-CH_2CH_2SO_3H$, carboxymethyl, diethylaminoethyl, guanidino, $-C_6H_4(BO_2H_2)$, $-C_6H_4HgOCOCH_3$, $-C_6H_4AsO$, tris(hydroxymethyl) methyl, n-butyl, n-octyl, $-CH_2(CH_2)_4COOH$, and ethylmercapto;

matrix is particulate bonded silica or controlled pore glass beads;

Z is oxygen or sulfur; and

[] is a support selected from a straight chain alkyl having 2 to 8 carbons, aryl or alkyl aryl.

3. The compound of claim 2 wherein R" is $C_6H_4(BO_2H_2)$.

4. The compound of claim 2 wherein R" is $C_6H_4HgOCOCH_3$.

5. The compound of claim 2 wherein R" is carboxymethyl.

6. The compound of any of claims 1, 2, 3, 4 or 5 wherein said alkyl chain is $(CH_2)_n$ where n=3 or 4.

* * * * *

UNITED STATES PATENT AND TRADEMARK OFFICE
CERTIFICATE OF CORRECTION

PATENT NO. : 4,837,348

DATED : June 6, 1989

INVENTOR(S) : Mark L. Stolowitz, et al

It is certified that error appears in the above-identified patent and that said Letters Patent is hereby corrected as shown below:

Col. 6, line 5, replace "varius" by --various--.

Col. 8, line 23, replace "patriculate" by --particulate--.

Signed and Sealed this

Twenty-first Day of May, 1991

Attest:

HARRY F. MANBECK, JR.

Attesting Officer

Commissioner of Patents and Trademarks